US012103571B2

(12) United States Patent
Taylor

(10) Patent No.: US 12,103,571 B2
(45) Date of Patent: Oct. 1, 2024

(54) LONGITUDINAL DOOR OPERATING MECHANISM

(71) Applicant: Railcar Innovations, LLC, Cleveland, TN (US)

(72) Inventor: Fred J. Taylor, Independence, KY (US)

(73) Assignee: Railcar Innovations, LLC, Cleveland, TN (US)

( * ) Notice: Subject to any disclaimer, the term of this patent is extended or adjusted under 35 U.S.C. 154(b) by 808 days.

(21) Appl. No.: 17/322,147

(22) Filed: May 17, 2021

(65) Prior Publication Data

US 2022/0363294 A1 Nov. 17, 2022

(51) Int. Cl.

| | |
|---|---|
| ***B61D 7/02*** | (2006.01) |
| ***B61D 7/16*** | (2006.01) |
| ***B61D 7/18*** | (2006.01) |
| ***B61D 7/24*** | (2006.01) |
| ***B61D 7/26*** | (2006.01) |
| ***B61D 7/28*** | (2006.01) |
| ***E05F 15/53*** | (2015.01) |
| ***E05F 15/56*** | (2015.01) |
| *B61D 7/20* | (2006.01) |

(Continued)

(52) U.S. Cl.

CPC ................. *B61D 7/02* (2013.01); *B61D 7/16* (2013.01); *B61D 7/18* (2013.01); *B61D 7/24* (2013.01); *B61D 7/26* (2013.01); *B61D 7/28* (2013.01); *E05F 15/53* (2015.01); *E05F 15/565* (2015.01); *B61D 7/20* (2013.01); *B61D 7/22* (2013.01); *B61D 7/30* (2013.01); *E05Y 2201/454* (2013.01); *E05Y 2201/626* (2013.01); *E05Y 2900/51* (2013.01)

(58) Field of Classification Search

CPC ... B61D 7/02; B61D 7/16; B61D 7/18; B61D 7/20; B61D 7/22; B61D 7/24; B61D 7/26; B61D 7/28; B61D 7/30; E05F 15/53; E05F 15/565; E05Y 2201/454; E05Y 2201/626; E05Y 2900/51

USPC .................................................. 105/251, 240

See application file for complete search history.

(56) References Cited

U.S. PATENT DOCUMENTS 4,222,334 A * 9/1980 Peterson .................. B61D 7/24 105/250
4,688,488 A * 8/1987 Adams ..................... B61D 7/26 105/313

(Continued)

FOREIGN PATENT DOCUMENTS

CA 3129875 A1 * 3/2011 ............... B61D 7/02

*Primary Examiner* — S. Joseph Morano
*Assistant Examiner* — James William Jones
(74) *Attorney, Agent, or Firm* — Chambliss, Bahner & Stophel, P.C.; Stephen D. Adams

(57) ABSTRACT

A door operating mechanism for operating longitudinal doors of a railroad hopper car. The mechanism includes operating members that are coupled to ends of the doors. These operating members are each actuated by a separate actuating device that is coupled to a top surface of a sill of the hopper car. Door supports have one end coupled to a door and an opposite end coupled for rotation to an actuating device. When a power cylinder coupled to the operating member is activated, the actuating devices are rotated. This rotation causes the door supports to shift in opposite directions and to open the longitudinal doors.

16 Claims, 9 Drawing Sheets

(51) Int. Cl.
*B61D 7/22* (2006.01)
*B61D 7/30* (2006.01)

(56) References Cited

U.S. PATENT DOCUMENTS

| | | | | | |
|---|---|---|---|---|---|
| 5,163,372 | A * | 11/1992 | Galvan | B61D 7/28 | 105/287 |
| 2004/0244638 | A1 * | 12/2004 | Taylor | B61D 7/28 | 105/286 |
| 2005/0092202 | A1 * | 5/2005 | Taylor | B61D 7/28 | 105/280 |
| 2010/0275811 | A1 * | 11/2010 | Creighton | B61D 7/24 | 105/307 |
| 2014/0261069 | A1 * | 9/2014 | Bis | B61D 7/26 | 105/253 |
| 2018/0305967 | A1 * | 10/2018 | Bis | B61D 7/28 | |

* cited by examiner

LONGITUDINAL DOOR OPERATING MECHANISM

FIELD

The present invention relates generally to an apparatus for opening the rotating doors of a railroad hopper car. More particularly, the present invention relates to an apparatus for opening longitudinal doors of a railroad hopper car.

BACKGROUND

With initial reference to FIG. 1, one common type of railroad freight car 10 in use today is shown. In this type of freight car 10, a load carried by the freight car is discharged through hoppers in the underside of the body. Such cars are generally referred to as "hopper" cars and are used to haul coal, phosphate and the like. Hopper cars 10 of the type illustrated are typically provided with a pair of longitudinal doors 12, a plurality of wheels 14, and a longitudinally extending center sill 16. Certain hopper cars 10 lack a single, continuous center sill. Instead, as shown in FIG. 2, the car might be equipped with a pair of stub sills 26*a*, 26*b* located at each end of the car. In use, after hopper cars are located over an unloading pit, the doors 12 of the hoppers are opened by pairs of operating mechanisms, thereby allowing the material within the hopper to be emptied into the pit.

One problem found in many conventional operating mechanisms used in opening hopper doors is that each actuating mechanism is connected to doors from two separate hoppers. Thus, if the mechanism fails, it effects the operation of two hoppers. Additionally, certain conventional operating mechanisms limit the distance of the door motion, thus limiting the open area of the car's bottom. This arrangement slows the unloading process and causes additional costs and potential damage to the car due to increased periods in thaw sheds. A further disadvantage of some of the prior art hopper door mechanisms are that they are designed exclusively for new railcar construction.

Attempts have been made to overcome the above-described problems. For example, U.S. Pat. No. 6,955,126, entitled Railroad Hopper Car Longitudinal Door Actuating Mechanical (the "Taylor" system), the content of which is incorporated herein in its entirety, discloses an actuating system having an operating member that rotates to move hopper doors away from a hopper. With continued reference to FIG. 2 and with further reference to FIG. 3, a portion of the Taylor system is shown. Using the Taylor system, when it is desired to open longitudinal doors 12 mounted to a railcar 10 in order to empty the railcar of its contents, air is applied to cylinder 40, causing clevis 46 to begin to move away from the cylinder. Continuing this movement results in operating shaft 36 rotating, which then causes actuating beam 32 to shift leftwards (as seen in FIG. 2), which then results in operating shaft 38 also rotating. Ultimately, with the rotation of operating shafts 36, 38, levers 68 and 146 each apply a force to their respective actuating devices 76. The actuating devices 76 rotate about pivoting shafts 80*a* and 80*b* in a counter-clockwise direction and clockwise direction, respectively (as seen in FIG. 2) to a down position. The simultaneous rotation of these actuating devices 76 enable a pair of door supports 100 located at each end of car 10 to shift away from one another, as can be most clearly seen in FIGS. 4 and 5.

As actuating devices 76 rotate downwards, transfer lever 92 moves to the position shown as 92', while supports 100 separate to the positions shown as 100', and doors 12 separate to the positions shown at 12'. Further rotation of devices 76, aided by the weight of the material in the hopper, causes further movement of the supports and doors to the positions shown at 100" and 12", allowing the contents of car 10 to empty quickly. Reversing the rotation of the operating member closes the hopper doors. Actuating device 76 rotates about pivoting shafts 80*a*, 80*b*, which are fixed for rotation between shaft mount reinforcers 82 located at the end of the hopper car. These shaft mount reinforcers 82 are located inside of and beneath a full-length center sill (12, in FIG. 1) or a stub sill (26*a*, 26*b*, in FIG. 2). This mounting location exposes the actuating device 76 to potential damage from beneath the hopper car. Additionally, the Taylor system requires the sill to be cut in order to install the pivoting shafts 80*a*, 80*b* between the shaft mount reinforcers 82.

Notes on Construction

The use of the terms "a", "an", "the" and similar terms in the context of describing embodiments of the invention are to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. The terms "substantially", "generally" and other words of degree are relative modifiers intended to indicate permissible variation from the characteristic so modified. The use of such terms in describing a physical or functional characteristic of the invention is not intended to limit such characteristic to the absolute value which the term modifies, but rather to provide an approximation of the value of such physical or functional characteristic.

Terms concerning attachments, coupling and the like, such as "attached", "connected" and "interconnected", refer to a relationship wherein structures are secured or attached to one another either directly or indirectly through intervening structures, as well as both moveable and rigid attachments or relationships, unless otherwise specified herein or clearly indicated as having a different relationship by context. The term "operatively connected" is such an attachment, coupling or connection that allows the pertinent structures to operate as intended by virtue of that relationship.

The use of any and all examples or exemplary language (e.g., "such as" and "preferably") herein is intended merely to better illuminate the invention and the preferred embodiments thereof, and not to place a limitation on the scope of the invention. Nothing in the specification should be construed as indicating any element as essential to the practice of the invention unless so stated with specificity.

As used herein, the term "power cylinder" means an electric, hydraulic, electro-hydraulic, pneumatic, mechanical, or other device that generates force which is directed in a straight line, such as a linear actuator.

SUMMARY

The above and other needs are met by a door operating mechanism for operating longitudinal doors associated with a hopper of a railroad hopper car, said railroad hopper car including a body having a first end and a second end, and a pair of said longitudinal doors, each having a first end and a second end, extending between said first and second ends of said body, said doors rotatable between a first position closing the hopper and a second position opening the hopper, and equipped with an operating beam that is moveable with respect to a sill, and a power cylinder. The door operating mechanism includes a first operating shaft that is coupled to the power cylinder and that is mounted for rotation at the first end of the body. A second operating shaft is mounted for rotation at the second end of the body. An actuating beam is coupled to the first operating shaft at the first end of the body and is coupled to the second operating shaft at the second end of the body. A first actuating device is located above the sill and is coupled to a top surface of the sill at the first end of the body. Similarly, a second actuating device is located above the sill and is coupled to a top surface of the sill at the second end of the body. A first set of door supports is located at the first end of the body. Each first door support has one end coupled to a first end of one of the longitudinal doors and an opposite end coupled for rotation to the first actuating device. Likewise, a second set of door supports is located at the second end of the body. Each second door support has one end coupled to a second end of one of the longitudinal doors and an opposite end coupled for rotation to the second actuating device. When the power cylinder is activated, the operating shafts rotate such that said first and second actuating devices rotate. This rotation causes the door supports of each set to shift in opposite directions to rotate the longitudinal doors from the first (closed) position to the second (open) position.

In certain preferred embodiments, the first and second actuating devices each include a pair of spaced apart elongate arms. These elongate arms separate three sections of the actuating device: a center section located between the elongate arms, a left end section located outside of one of the elongate arms, and a right end section located outside of the other elongate arm. Each elongate arm has a first end rotatably coupled to one set of door supports, a second end rotatably coupled to the top surface of the sill, and an extension section located between the first and second ends that is operatively coupled to one of said operating shafts. In certain embodiments, an extension support rigidly connects together the extension section of the pair of spaced apart elongate arms. However, the extension support does not connect the first end or the second end of the elongate arms together in order to provide a first open area between the first end of the elongate arms and a second open area between the second ends of the elongate arms.

In certain embodiments, the first and second actuating devices each include a shaft mount that is located in the second open area and that is mounted to the top surface of the sill. A shaft extends between the elongate arms and then through the shaft mount at the second open area for rotatably coupling the elongate arms to the shaft mount. In some cases, lower mounting openings may be provided in the second end of each of the elongate arms that are each configured to receive an end of the shaft when the shaft is inserted through the shaft mount. In some cases, each shaft mount includes a pair of shaft mount bases mounted to the top surface of the sill immediately adjacent an inner surface of an elongate arm and each having a semi-circular shaft receiver. Shaft mount caps are then removably mounted to each of the shaft mount bases and each shaft mount cap has a corresponding semi-circular shaft receiver. When a shaft mount cap is mounted to a shaft mount base, the semi-circular shaft receivers align to form a circular opening configured to receive and securely hold a portion of the shaft. In certain cases, each shaft is a profiled shaft that includes ends having a first diameter D1 that is sized to fit into the circular opening of the shaft mount. Preferably, the opening is sized and configured to substantially prevent the shaft from rotating with respect to the shaft mount when the shaft mount cap is mounted to the shaft mount base. The profiled shaft also preferably includes a center section located between the ends that has a diameter D2 that is smaller than diameter D1.

Certain embodiments of the present invention include stop ends extending outwards from the elongate arms that are each sized and configured to contact one of said door supports in the first position and to limit rotation of the one door support.

Certain embodiments of the present invention include separate transfer levers that rotatably couple each one of said door supports to one of said actuating devices. Preferably, each transfer lever is configured to rotate with respect to the actuating device to which it is mounted about a first axis. Additionally, each door support is configured to rotate with respect to the transfer lever to which it is mounted about a second axis. In some cases, the first axis is orthogonal to the second axis. In certain cases, each of the transfer levers include a lower planar section that is configured to be inserted into and rotatably coupled with a bifurcated section of the door support. Additionally, each of the transfer levers include a cylindrical upper section having a thru hole configured for insertion onto and rotation about a pin end extending outwards from each side of the actuating devices. More particularly, in some cases, a first pin couples together a first set of transfer levers that are associated with the first actuating device. This results in the first set of transfer levers rotating about the first axis of the first actuating device in unison. Similarly, a second pin couples together a second set of transfer levers that are associated with the second actuating device. Again, this results in the second set of transfer levers rotating about the first axis of the second actuating device in unison. In certain preferred embodiments, the first pin is rotatably inserted through upper mounting openings formed in the first end of each elongate arm of the first actuating device. Likewise, the second pin is rotatably inserted through upper mounting openings formed in the first end of each elongate arm of the second actuating device.

In certain embodiments, a center sill extends between the first end and the second end of the body, and an actuating device is mounted to a top surface disposed on the center sill. In some cases, both actuating devices are mounted to the top surface disposed on the center sill. In other embodiments, the first end of the body contains a stub sill and one of the actuating devices is mounted to a top surface disposed on the stub sill. In those cases, the second end of the body also contains a stub sill and one of the actuating devices is also mounted to a top surface disposed on the stub sill at the second end of the body.

BRIEF DESCRIPTION OF THE DRAWINGS

Further advantages of the invention are apparent by reference to the detailed description when considered in conjunction with the figures, which are not to scale so as to more clearly show the details, wherein like reference numerals represent like elements throughout the several views, and wherein:

FIG. 1 is a front elevation view of a profiled shaft of the door operating mechanism shown in FIG. 7;

DETAILED DESCRIPTION

Figure 4:
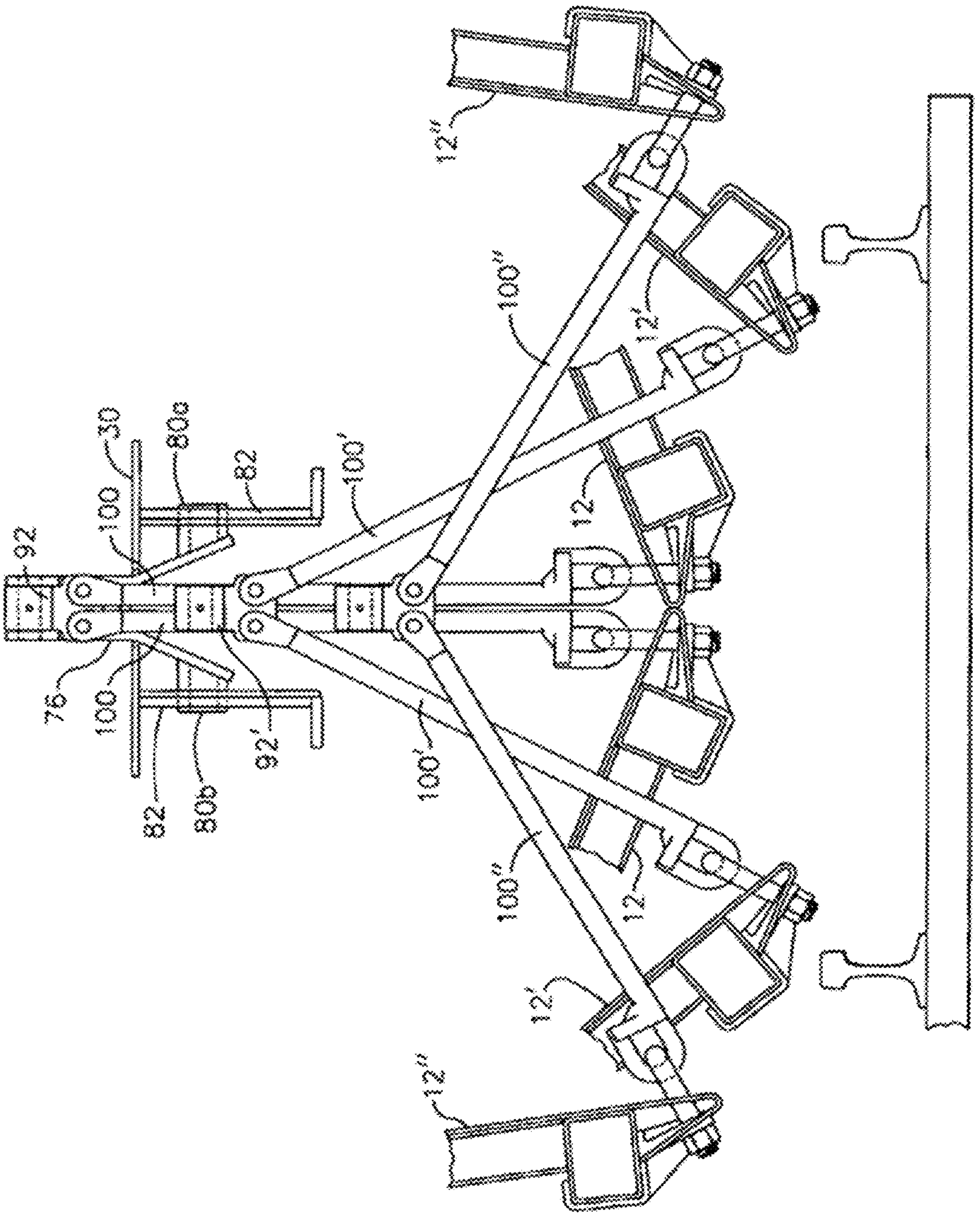
FIG. 4 (Prior Art)
FIG. 4 is a partial sectional view of the hopper car of FIG. 2 taken along line 4-4.
Figure 5:
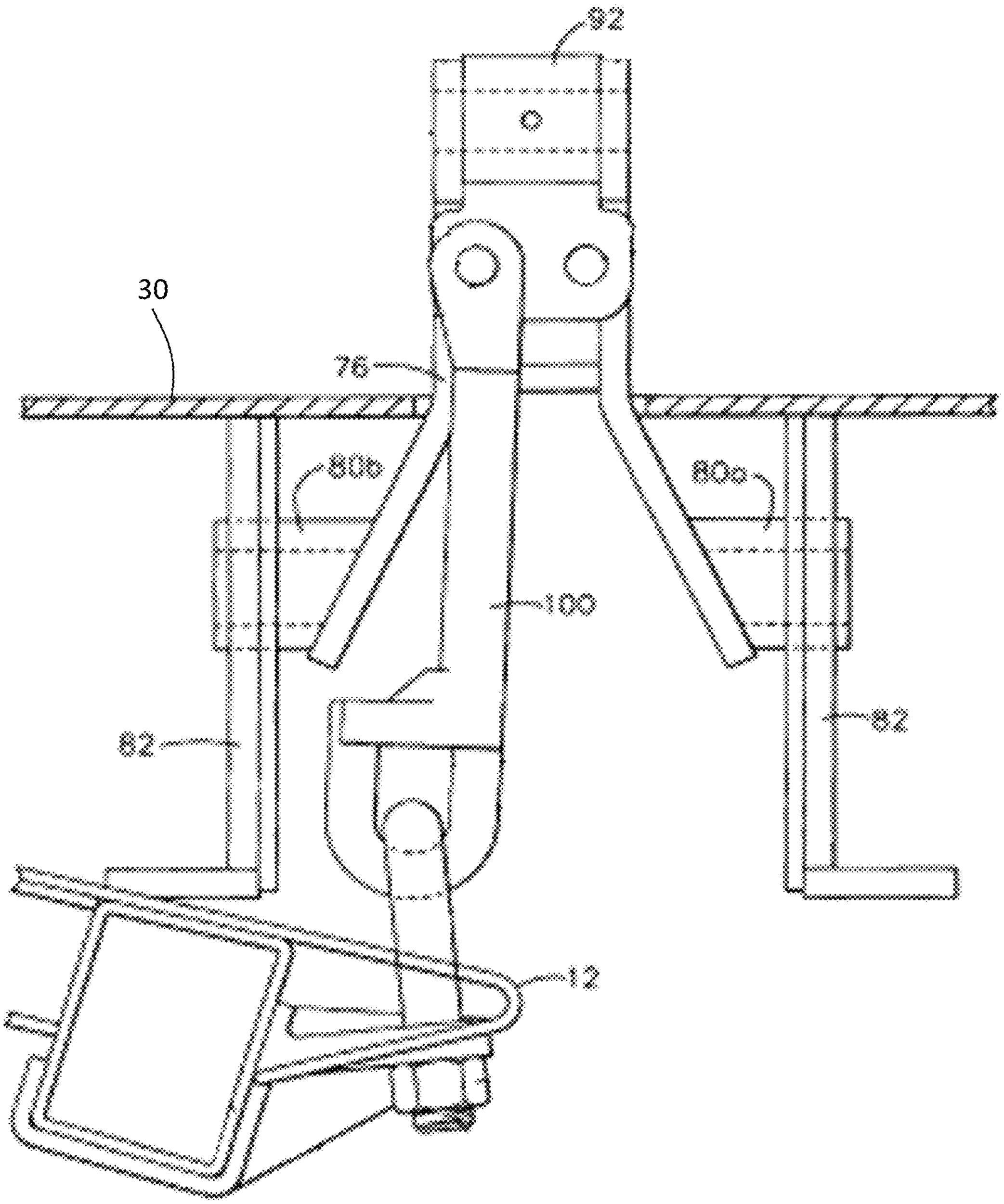
FIG. 5 (Prior Art)
FIG. 5 is a detailed view depicting a portion of the door operating mechanism of FIG. 4.
Figure 7:
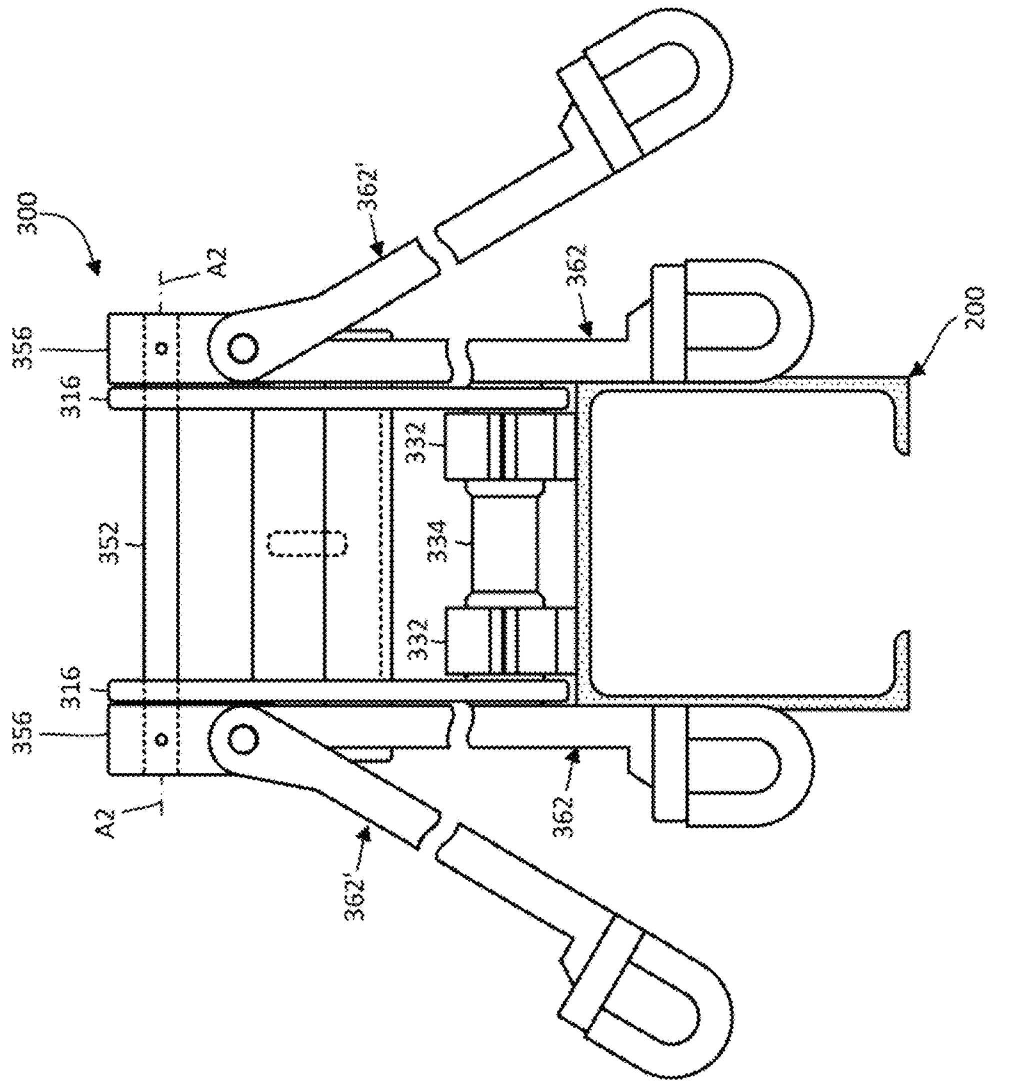
FIG. 7 is a front elevation view depicting the door operating mechanism of FIG. 6 in a closed and partially open position.
Figure 6:
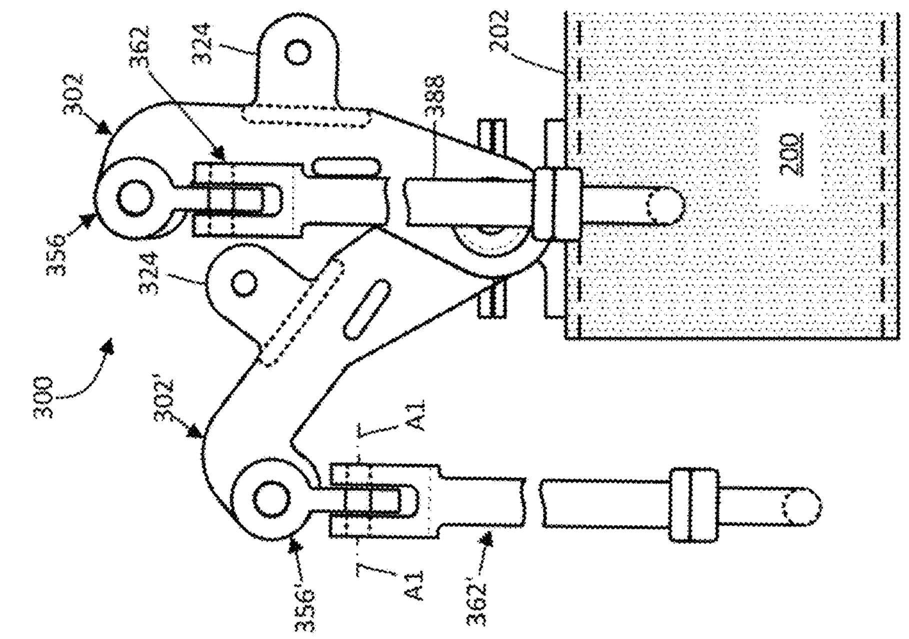
FIG. 6 is a side elevation view depicting a portion of a sill of a hopper car and a door operating mechanism mounted to a top surface of the sill for opening longitudinal doors of the hopper car according to an embodiment of the present invention.

Referring now to FIGS. 6 and 7, there is provided a sill 200 of a hopper car and a door operating mechanism 300 mounted on top of the sill, preferably to a top surface 202 of the sill, for opening longitudinal doors of the hopper car according to an embodiment of the present invention. The preferred embodiment of the present invention can be installed on a center sill of a full-length sill or a stub sill, including those of existing hopper cars. This door operating mechanism 300 may be used, for example, to operate the longitudinal doors 12 mounted to a railcar 10 shown in FIGS. 4 and 5. However, unlike the Taylor system discussed above, due to its mounting to the top surface 202 of the sill 200, the mechanism 300 of the present invention may be installed on the hopper car without the need to cut the sill. Since this door operating mechanism 300 is mounted to the top surface 202 of the sill 200, it is protected against damage more than the Taylor system mentioned above, which is placed inside of and beneath the sill. In operation, the door operating mechanism is configured to move between a closed position, where the longitudinal doors are closed, and an open position, where the longitudinal doors are open.

Figure 1:
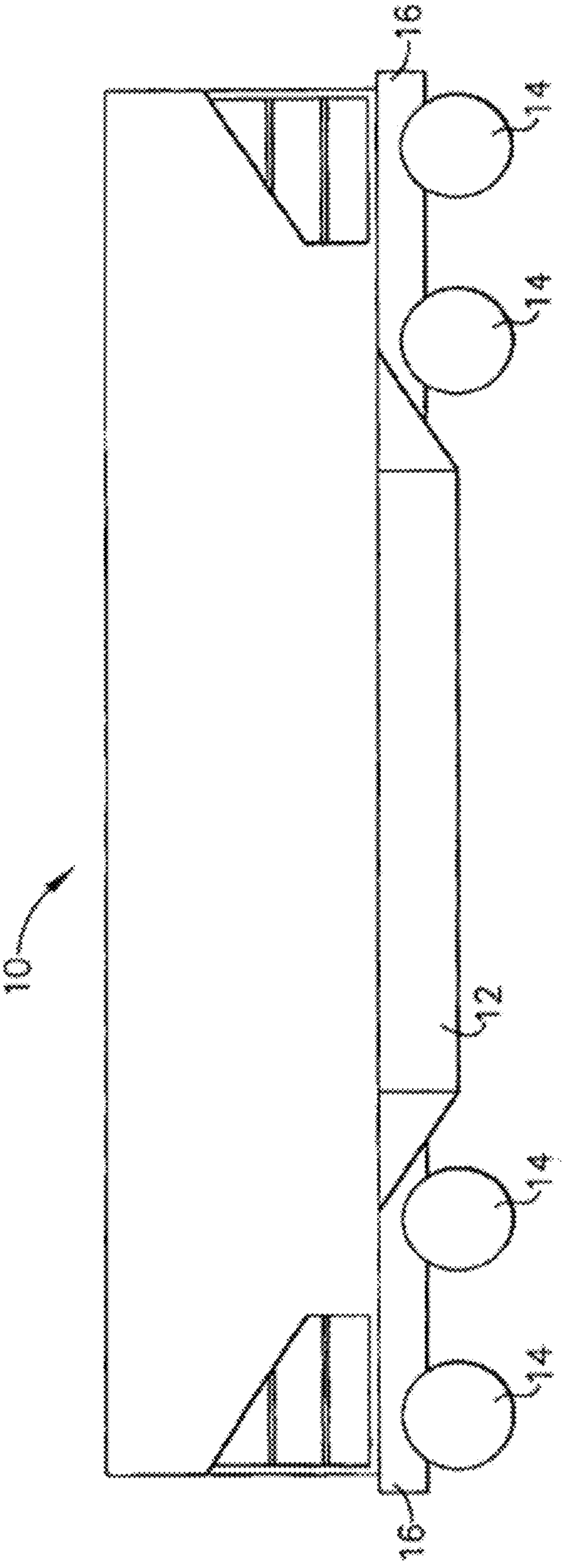
FIG. 1 (Prior Art)
FIG. 1 is a side elevation view of a standard hopper car having longitudinal doors.
Figure 2:
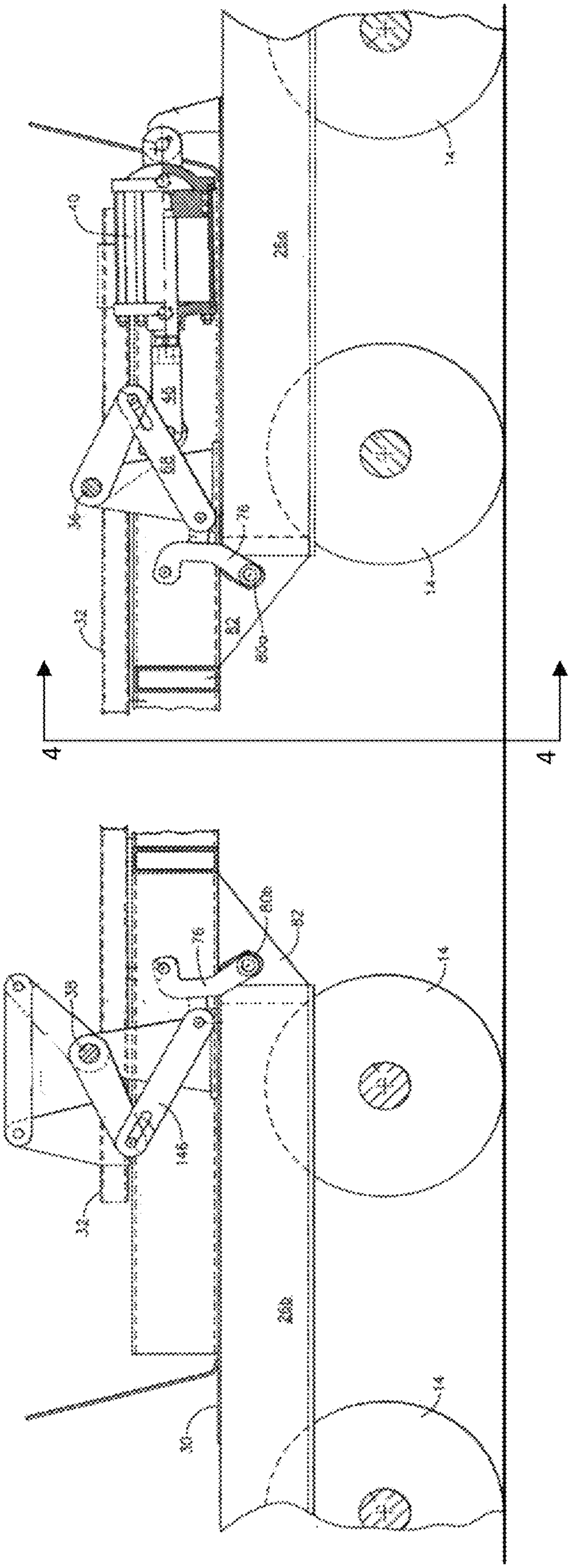
FIG. 2 (Prior Art)
FIG. 2 is a side elevation view of depicting a conventional door actuating mechanism mounted to right- and left-hand ends of the hopper car of FIG. 1.
Figure 3:
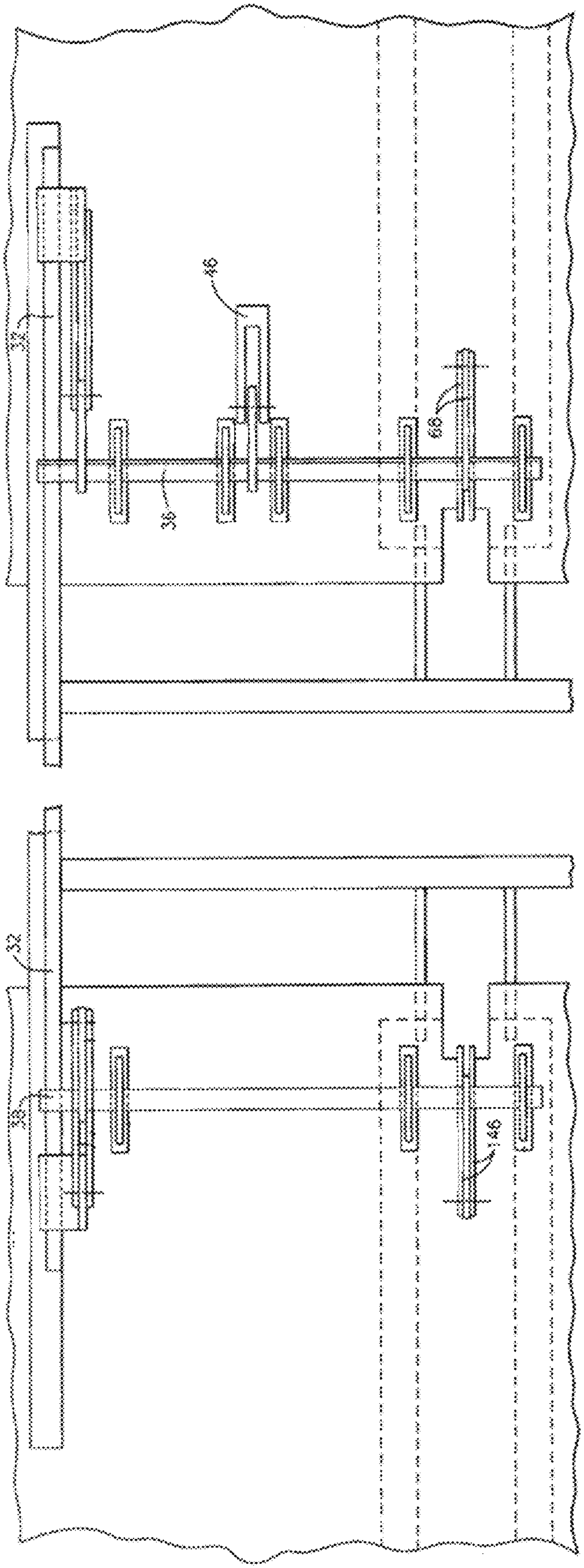
FIG. 3 (Prior Art)
FIG. 3 is a plan view of the door actuating mechanism of FIG. 2.
Figure 9:
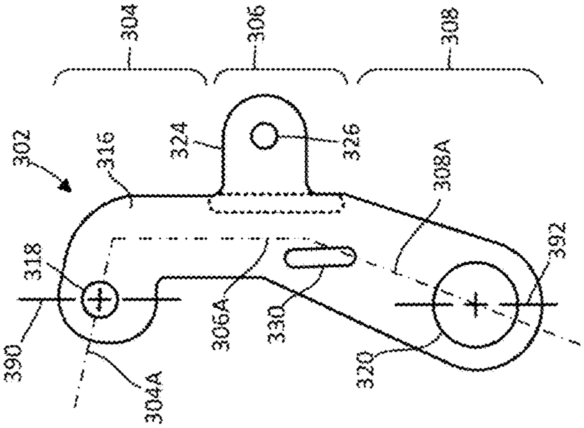
FIG. 9 is a right-hand side elevation view of the actuating device of the door operating mechanism shown in FIG. 6.
Figure 8:
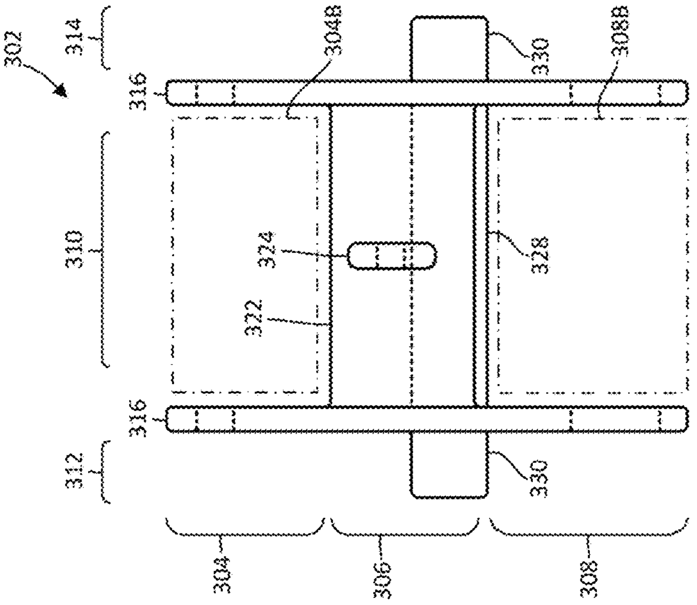
FIG. 8 is a rear elevation view of an actuating device of the door operating mechanism shown in FIG. 7.

With reference to FIGS. 8 and 9, there is shown main actuating device 302, which includes a pair of spaced apart elongate arms 316, each preferably having a first end 304, an extension section 306, and a second end 308. A center section 310 of the main actuating device 302, located between the arms 316, includes open area 304B at the first end 304 and open area 308B at the second end 308. A left end section 312 of the main actuating device 302 is located outside one of the left arm 316 (as seen in FIG. 8) and a right end section 314 of the actuating device is located outside the right arm (as seen in FIG. 8). Preferred arms 316 extend along the entire height of the main actuating device 302. As shown best in FIG. 9, when the main actuating device 302 is oriented vertically, a portion of the extension section 306 is also generally oriented vertically. At the same time, a portion of the first end 304 extends leftwards (as seen in FIG. 9) away from the top of the extension section 306 at a sharp angle (e.g., approximately 80-100 degrees measured between a midline 304A of the first end 304 and a midline 306A of the extension section 306). Upper mounting openings 318 are formed in the first end 304 of each arm 316. At the opposite end of the main actuating device 302, the second end 308 extends leftwards (as seen in FIG. 9) away from the bottom of the extension section 306 at a more moderate angle (e.g., approximately 140-160 degrees measured between the midline 306A of the extension section 306 and a midline 308A of the second end 308). Lower mounting openings 320 are formed in the second end 308 of each arm 316. The arms 316 are rigidly connected together in spaced apart arrangement by an extension support 322. An extension 324 having a center mounting opening 326 extends away from the back (i.e., the right side, as seen in FIG. 9) of the extension support 322. The actuating device 302 may be installed for use on a hopper car by coupling extension 324 to a lever, such as lever 68 and lever 146 (shown in FIG. 2), sized and configured for use with this door operating mechanism 300. The arms 316 are also preferably rigidly connected together in spaced apart arrangement by a stop 328, which extends through the center section 310 of the actuating device 302. The stop 328 is sized such that a stop end 330 extends through and then outwards from each arm 316 and into the left and right end sections 312, 314 of the main actuating device 302, as shown best in FIG. 8. However, in other embodiments, separate stop ends 330 may be mounted to the outside of each arm 316 without the stop 328 extending through the center section 310 between the arms.

Figure 11:
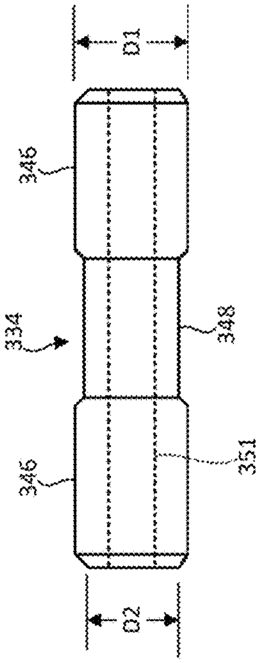
Figure 10:
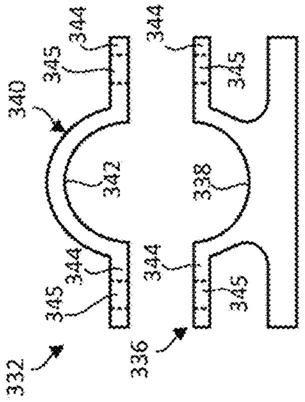
FIG. 10 is an exploded view depicting a shaft mount base of the door operating mechanism shown in FIG. 7.

The main actuating device 302 may be rotatably mounted to the top surface 202 of the sill 200, as illustrated in FIGS. 6 and 7, using the shaft mount 332, which is preferably located in open area 308B (FIG. 8). As shown in FIG. 10, the shaft mount 332 is preferably comprised of shaft mount base 336 having a semi-circular shaft receiver 338 and corresponding shaft mount cap 340 having a corresponding semi-circular shaft receiver 342. In use, the shaft mount base 336 is preferably mounted (fixedly or removably) to the top surface 202 of the sill 200. Then, shaft mount cap 340 is preferably removably fastened to the shaft mount base 336. Flanges 344, located on each side of both shaft receivers 338, 342, are preferably provided with a bolt hole 345 (shown in dashed lines) that are each configured to receive a fastener for removably connecting the shaft mount base 336 to the shaft mount cap 340. When the shaft mount base 336 is connected to the shaft mount cap 340, the shaft receivers 338, 342 align to form a circular opening that is sized to receive a shaft in order to mount the arms 316 to the sill 200. In FIG. 11, a preferred profiled shaft 334 is shown, which shaft includes end sections 346 having a first diameter D1 and a center section 348 located between the end sections and having a smaller diameter D2. The smaller center section 348 is is provided as a means to reduce weight. Similarly, a hole 351 (illustrated by dashed lines) extends laterally through the profiled shaft 334, which reduces weight and provides increased strength compared to a solid shaft.

Figure 12:
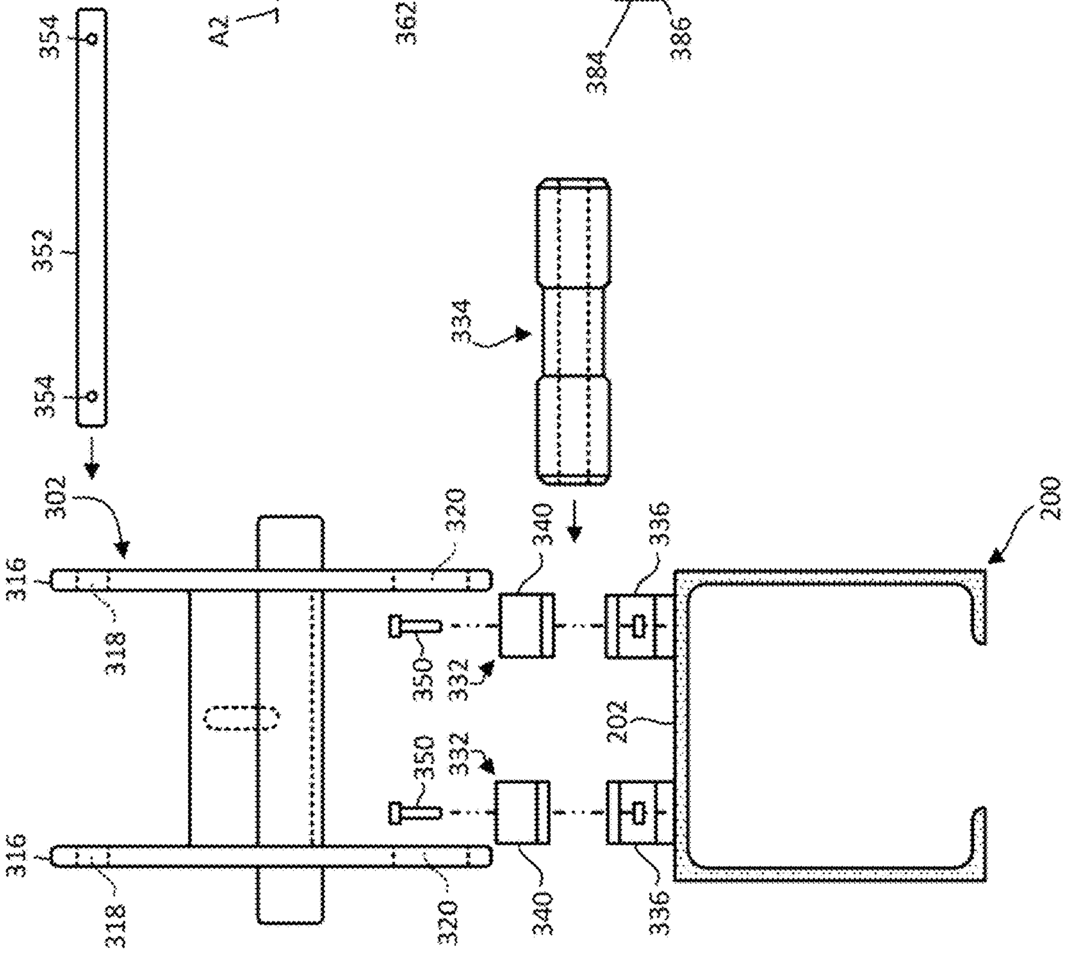
FIG. 12 is an exploded view of a partially assembled door operating mechanism of the present invention.

As shown in FIG. 12, a pair of shaft mount bases 336 is first installed onto the top surface 202 of the sill 200. The shaft mount bases 336 are spaced apart from one another and are preferably placed just inside of the arms 316 of the actuating device 302. Shaft mounting caps 340 are loosely secured to the shaft mounting bases, such as by bolts 350.

The actuating device 302 is then placed over the sill 200 such that the lower mounting openings 320 are aligned with the circular opening formed by the shaft mount 332. Actuating device 302 is ideally positioned on the sill 200 along a center line of the hopper car. Next, the profiled shaft 334 is passed through the lower mounting openings 320 of one of the arms 316, then through the circular opening of the two shaft mounts 332, and finally through the lower mounting opening of the other arm. The profiled shaft 334 is positioned such that an end section 346 extends through each shaft mount 332 and a lower mounting opening 320 of each one of the arms 316, which rotatably couples the actuating device 302 to the mounting base and the sill 200. Once the profiled shaft 334 is correctly positioned, the shaft mounting caps 340 are then secured to the shaft mount bases to lock the shaft in place.

Figure 13:
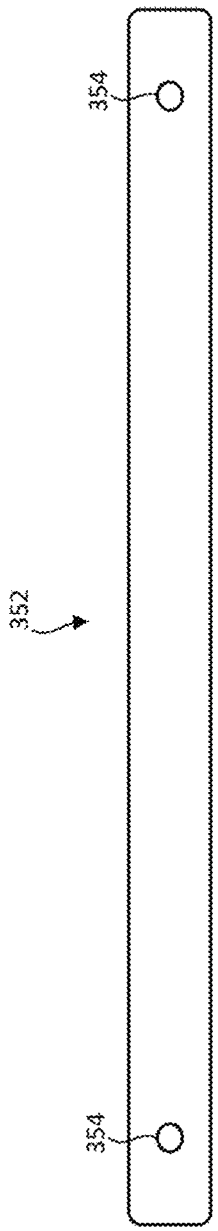
FIG. 13 is a front elevation view of a pin of the door operating mechanism shown in FIG. 7.
Figure 17:
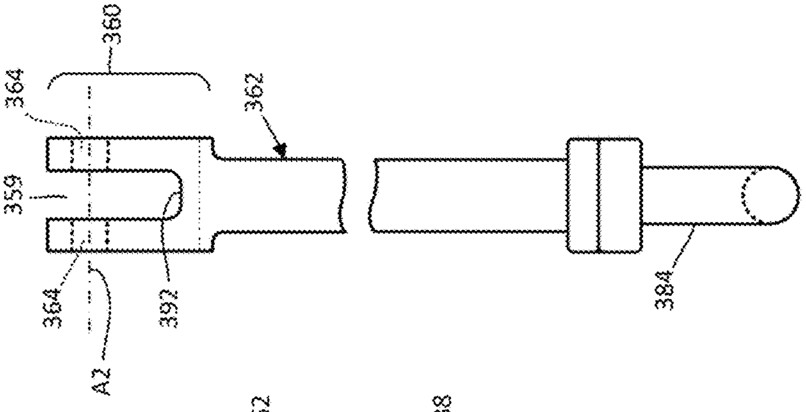
FIGS. 16 and 17 are front and side elevation views, respectively, of supports of the door operating mechanism shown in FIG. 7.
Figure 16:
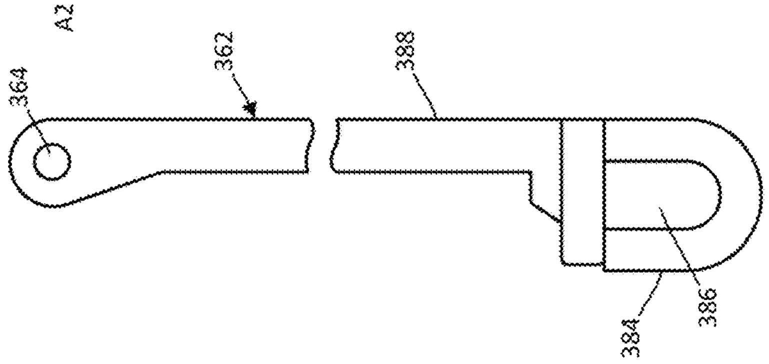
Figure 15:
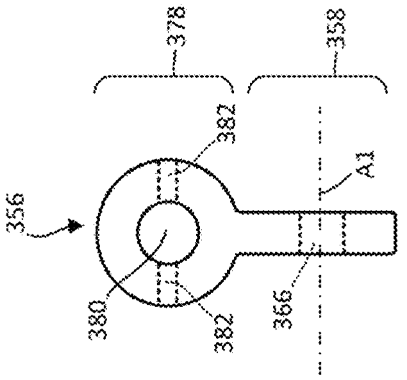
FIGS. 14 and 15 are front and right-hand side elevation views, respectively, of a transfer lever of the door operating mechanism shown in FIG. 7.

Referring to FIGS. 9 and 12 and with further reference to FIG. 13, a pin 352 is inserted through the upper mounting openings 318 of the arms 316. The pin 352 is sized to extend entirely through open area 304B and so that opposite ends of the pin, each including a fastener opening 354, extend through the arms 316 and are located in the left end section 312 and right end section 314 of the first end 304. Transfer levers 356, depicted in FIGS. 14 and 15, include a lower planar section 358 that is configured to pass into a space 359 formed in bifurcated section 360 of the support 362 depicted in FIGS. 16 and 17. The bifurcated section 360 of the support 362 is rotatably coupled to the lower planar section 358 by aligning fastener openings 364 with a corresponding fastener opening 366 in the transfer lever 356 and then passing a fastener (not shown) through the aligned fastener openings. As such, support 362 is configured to rotate with respect to the transfer lever 356 about axis A1.

Figure 14:
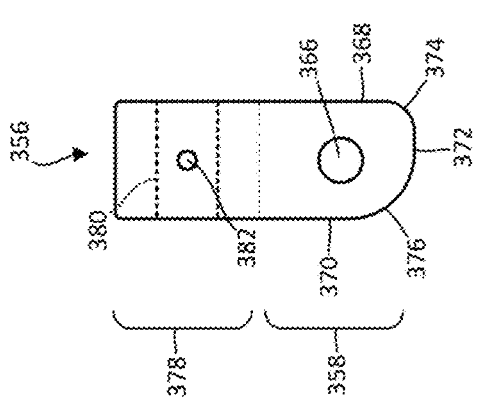

In preferred embodiments, as shown in FIG. 14, the planar section 358 includes an inner edge 368, an outer edge 370, and a bottom edge 372. An inner rounded transition or inner fillet 374 having a first radius is formed between the inner edge 368 and the bottom edge 372. An outer rounded transition or outer fillet 376 having a second radius is formed between the outer edge 370 and the bottom edge 372. In preferred embodiments, the first radius is smaller than the second radius. For example, in certain preferred embodiments, the first (inner) radius is ¾" and the second (outer) radius is 1⅝" The larger second radius is sized such that a bottom edge 392 (FIG. 17) of the bifurcated section 360 travels just over the outer fillet 376 as the support 362 rotates about axis A1 outwards with respect to the transfer lever 356. Accordingly, in certain preferred embodiments, the transfer lever 356 is asymmetrical in a front view (FIG. 14) about a vertical line passing through the middle of the transfer lever. However, at the same time, the transfer lever 356 may be symmetrical in a side view (FIG. 15) about a vertical line passing through the middle of the transfer lever.

Figure 18:
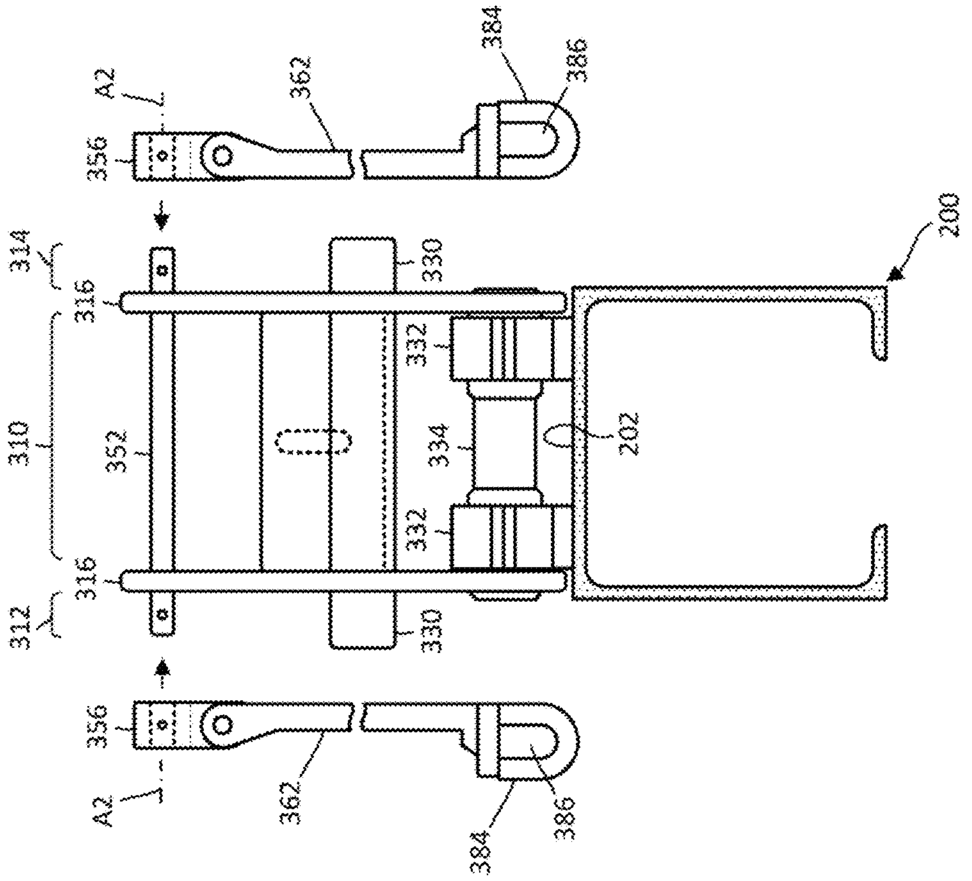
FIG. 18 is an exploded view of a partially assembled door operating mechanism of the present invention.

Referring again to FIGS. 14, 15, and 17, an upper cylindrical section 378 having a hole 380 and a fastener opening 382 that passes through the cylindrical section at the hole. With reference to FIG. 18, after pin 352 has been inserted through the arms 316, a transfer lever 356, mounted to a support 362, is placed onto each end of the pin at the left end section 312 and right end section 314 by sliding the opposing ends of the pin into the thru holes 380 of each cylindrical section 378. When placed onto the pin 352, the transfer levers 356 are preferably oriented such that the inner edge 368 faces inwards towards arm 316 and outer edge 370 faces away from the arm. The transfer levers 356 slide onto each end of the pin 352 until fastener opening 382 is aligned with fastener opening 354. The transfer levers 356 and pin 352 are locked together by passing fasteners (not shown) through each pair of aligned fastener openings 354, 382, which also secures the pin within the arms 316 while also allowing the pin and transfer levers to rotate together within the upper mounting openings 318 of the arms about axis A2.

The opposite end of each support 362 contains a U-shaped link 384 having an open area 386 that is mounted to each end of a longitudinal door. These doors are opened by mechanism 300 in the manner discussed below.

In general, the presently-disclosed mechanism 300 may be used in place of the actuating device 76 and transfer lever 92 shown best in FIG. 5. The mechanism 300 of the present invention may be installed by rotatably mounting the actuating device 302 onto shear plate 30 at both ends of the hopper car using shaft mounts 332 and then coupling extensions 324 to a suitable lever, such as lever 68 and lever 146, which has been sized and configured for use with this door operating mechanism. When it is desired to open longitudinal doors 12 to empty railcar of its content, air is applied to cylinder 40, causing clevis 46 to begin to move away from the cylinder. Continuing this movement ultimately results in actuating devices 302 located on each end of the longitudinal doors to rotate in opposite directions about their respective profiled shafts 334 from a closed position towards an open position.

With both actuating devices 302 rotating simultaneously in opposite directions, door supports 362 at each end of car begin to shift away from one another, as can be most clearly seen in FIGS. 6 and 7. In particular, the actuating device 302, transfer levers 356, and supports 362 are arranged such that rotational movement of actuating device about profiled shaft 334 in a counterclockwise direction (as seen in FIG. 6) causes supports to shift away from one another in opposite directions (as seen in FIG. 7). As actuating device 302 rotates about profiled shaft 334 to the position shown as 302', the transfer levers 356 mounted to each actuating device move to the position shown as 356', while supports 362 separate to the positions shown as 362'. Thus, in preferred embodiments, axes A1 and A2 are orthogonal to one another to assist in producing this desired movement of the supports 362. Further rotation of devices actuating devices 302, aided by the weight of the material in the hopper, causes further movement of the doors to the positions shown at 12" in FIG. 4, allowing the contents of car to empty quickly. If it is desired to permit car 10 to empty its contents only between the rails on which wheels 14 travel, door stops may be added to the underside of car such that the doors will stop in the position shown at 12'.

Reversing the rotation of the actuating device 302 closes the hopper doors. Referring again to FIGS. 6 and 16, in a preferred embodiment, when the doors 12 are closed, a rear edge 388 of the supports 362 contacts a stop end 330 located outside each arm 316 to halt the rotation to the actuating device. With reference to FIG. 9, when the actuating device 302 is moving to the above-described closed position, a vertical line 390 extending through the center of upper mounting opening 318 translates or moves past (i.e., rightwards of, as shown in FIG. 9) a similar vertical line 392 extending through the center of lower mounting opening 320, which provides a positive overcenter lock to add a safety feature to the hopper car and, thereby, more securely locking the doors in the closed position and assisting to avoid accidental opening.

Although this description contains many specifics, these should not be construed as limiting the scope of the invention but as merely providing illustrations of some of the presently preferred embodiments thereof, as well as the best mode contemplated by the inventor of carrying out the invention. The invention, as described herein, is susceptible to various modifications and adaptations as would be appreciated by those having ordinary skill in the art to which the invention relates.

What is claimed is:

1. A door operating mechanism for operating longitudinal doors associated with a hopper of a railroad hopper car, said railroad hopper car including a body having a first end and a second end, and a pair of said longitudinal doors, each having a first end and a second end, extending between said first and second ends of said body, said doors rotatable between a first position closing the hopper and a second position opening the hopper, and equipped with an operating beam that is moveable with respect to a sill, and a power cylinder, the door operating mechanism comprising:

- a first operating shaft coupled to the power cylinder and mounted for rotation at the first end of the body;
- a second operating shaft mounted for rotation at the second end of the body;
- an actuating beam coupled to said first operating shaft at the first end of the body and coupled to said second operating shaft at the second end of the body;
- a first actuating device disposed above the sill and coupled to a top surface of the sill at the first end of the body;
- a second actuating device disposed above the sill and coupled to a top surface of the sill at the second end of the body;
- a first set of door supports located at the first end of the body, each first door support having one end coupled to a first end of said longitudinal door and an opposite end of each first door support coupled for rotation to said first actuating device;
- a second set of door supports located at the second end of the body, each second door support having one end coupled to a second end of said longitudinal door and an opposite end of each second door support coupled for rotation to said second actuating device;
- wherein the first and second actuating devices each comprise a pair of spaced apart elongate arms that separate three sections of the actuating device:
  - a center section located between the elongate arms,
  - a left end section located outside of one of the elongate arms, and
  - a right end section located outside of the other elongate arm,
- wherein each elongate arm has a first end rotatably coupled to one set of door supports, a second end rotatably coupled to the top surface of the sill, and an extension section located between the first and second ends that is operatively coupled to one of said operating shafts,
- wherein, when the power cylinder is activated, said operating shafts rotate such that said first and second actuating devices rotate, causing said door supports of each set to shift in opposite directions to rotate the longitudinal doors between the first position and the second position.

2. The door operating mechanism of claim 1 wherein the first and second actuating devices each further comprise an extension support that rigidly connects together the extension section of the pair of spaced apart elongate arms but that does not connect the first end or the second end of the elongate arms together in order to provide a first open area between the first end of the elongate arms and a second open area between the second end of the elongate arms.

3. The door operating mechanism of claim 2 wherein the first and second actuating devices each further comprise:

- a shaft mount disposed in the second open area and mounted to the top surface of the sill; and
- a shaft extending between the elongate arms and through the shaft mount at the second open area for rotatably coupling the elongate arms to the shaft mount.

4. The door operating mechanism of claim 3 wherein the first and second actuating devices each further comprise lower mounting openings disposed in the second end of each of the elongate arms that are each configured to receive an end of the shaft when the shaft is inserted through the shaft mount.

5. The door operating mechanism of claim 3 wherein each shaft mount comprises:

- a pair of shaft mount bases mounted to the top surface of the sill immediately adjacent an inner surface of an elongate arm and each having a semi-circular shaft receiver; and
- a pair of shaft mount caps configured to removably mount to one of said shaft mount bases and each shaft mount cap having a corresponding semi-circular shaft receiver,
- wherein, when one of said shaft mount caps is mounted to one of said shaft mount bases, the semi-circular shaft receivers align to form a circular opening configured to receive and securely hold a portion of the shaft.

6. The door operating mechanism of claim 5 wherein each shaft is a profiled shaft comprising:

- ends having a first diameter D1 sized to fit into the circular opening of the shaft mount, wherein the opening is sized and configured to substantially prevent the shaft from rotating with respect to the shaft mount when the shaft mount cap is mounted to the shaft mount base; and
- a center section located between the ends that has a diameter D2 that is smaller than diameter D1.

7. The door operating mechanism of claim 1 comprising stop ends extending outwards from the elongate arms that are each sized and configured to contact one of said door supports in the first position and to limit rotation of the one door support.

8. The door operating mechanism of claim 1 wherein the first end of the body contains a stub sill, wherein one of said actuating devices is mounted to a top surface disposed on the stub sill.

9. The door operating mechanism of claim 8 wherein the second end of the body contains a stub sill, wherein one of said actuating devices is mounted to a top surface disposed on the stub sill.

10. A door operating mechanism for operating longitudinal doors associated with a hopper of a railroad hopper car, said railroad hopper car including a body having a first end and a second end, and a pair of said longitudinal doors, each having a first end and a second end, extending between said first and second ends of said body, said doors rotatable between a first position closing the hopper and a second position opening the hopper, and equipped with an operating beam that is moveable with respect to a sill, and a power cylinder, the door operating mechanism comprising:

- a first operating shaft coupled to the power cylinder and mounted for rotation at the first end of the body;
- a second operating shaft mounted for rotation at the second end of the body;
- an actuating beam coupled to said first operating shaft at the first end of the body and coupled to said second operating shaft at the second end of the body;

a first actuating device disposed above the sill and coupled to a top surface of the sill at the first end of the body;

a second actuating device disposed above the sill and coupled to a top surface of the sill at the second end of the body;

a first set of door supports located at the first end of the body, each first door support having one end coupled to a first end of said longitudinal door and an opposite end of each first door support coupled for rotation to said first actuating device;

a second set of door supports located at the second end of the body, each second door support having one end coupled to a second end of said longitudinal door and an opposite end of each second door support coupled for rotation to said second actuating device;

a center sill extending between the first end and the second end of the body, wherein one of said actuating devices is mounted to a top surface disposed on the center sill;

wherein, when the power cylinder is activated, said operating shafts rotate such that said first and second actuating devices rotate, causing said door supports of each set to shift in opposite directions to rotate the longitudinal doors between the first position and the second position.

11. The door operating mechanism of claim 10 wherein the first axis is orthogonal to the second axis.

12. The door operating mechanism of claim 10 wherein each of said transfer levers includes a lower planar section that is configured to be inserted into and rotatably coupled with a bifurcated section of the door support and a cylindrical upper section having a thru hole configured for insertion onto and rotation about a pin end extending outwards from each side of the actuating devices.

13. The door operating mechanism of claim 10 further comprising:

a first pin coupling together a first set of transfer levers that are associated with the first actuating device, such that said first set of transfer levers rotate about the first axis of the first actuating device in unison; and a second pin coupling together a second set of transfer levers that are associated with the second actuating device, such that said second set of transfer levers rotate about the first axis of the second actuating device in unison.

14. The door operating mechanism of claim 13 wherein:

the first pin is rotatably inserted through upper mounting openings formed in the first end of each elongate arm of the first actuating device; and the second pin is rotatably inserted through upper mounting openings formed in the first end of each elongate arm of the second actuating device.

15. A door operating mechanism for operating longitudinal doors associated with a hopper of a railroad hopper car, said railroad hopper car including a body having a first end and a second end, and a pair of said longitudinal doors, each having a first end and a second end, extending between said first and second ends of said body, said doors rotatable between a first position closing the hopper and a second position opening the hopper, and equipped with an operating beam that is moveable with respect to a sill, and a power cylinder, the door operating mechanism comprising:

a first operating shaft coupled to the power cylinder and mounted for rotation at the first end of the body;

a second operating shaft mounted for rotation at the second end of the body;

an actuating beam coupled to said first operating shaft at the first end of the body and coupled to said second operating shaft at the second end of the body;

a first actuating device disposed above the sill and coupled to a top surface of the sill at the first end of the body;

a second actuating device disposed above the sill and coupled to a top surface of the sill at the second end of the body;

a first set of door supports located at the first end of the body, each first door support having one end coupled to a first end of said longitudinal door and an opposite end of each first door support coupled for rotation to said first actuating device;

a second set of door supports located at the second end of the body, each second door support having one end coupled to a second end of said longitudinal door and an opposite end of each second door support coupled for rotation to said second actuating device;

a separate transfer lever rotatably coupling each one of said door supports to one of said actuating devices, wherein, when the power cylinder is activated, said operating shafts rotate such that said first and second actuating devices rotate, causing said door supports of each set to shift in opposite directions to rotate the longitudinal doors between the first position and the second position, and wherein each transfer lever is configured to rotate with respect to the actuating device to which it is mounted about a first axis and each door support is configured to rotate with respect to the transfer lever to which it is mounted about a second axis.

16. The door operating mechanism of claim 15 wherein both actuating devices are mounted to the top surface disposed on the center sill.

* * * * *